United States Patent
Banks et al.

(10) Patent No.: US 10,180,167 B2
(45) Date of Patent: Jan. 15, 2019

(54) BRAKE ASSEMBLY APPARATUS FOR A VEHICLE BRAKING SYSTEM

(71) Applicant: Bendix Spicer Foundation Brake LLC, Elyria, OH (US)

(72) Inventors: Daniel E. Banks, Climax, MI (US); David R Church, Richland, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 15/298,826

(22) Filed: Oct. 20, 2016

(65) Prior Publication Data

US 2018/0112728 A1 Apr. 26, 2018

(51) Int. Cl.
*F16D 65/00* (2006.01)
*F16D 51/28* (2006.01)
*F16D 51/20* (2006.01)

(52) U.S. Cl.
CPC ......... *F16D 65/0006* (2013.01); *F16D 51/28* (2013.01); *F16D 51/20* (2013.01); *F16D 65/0012* (2013.01)

(58) Field of Classification Search
CPC .. F16D 51/28; F16D 65/0006; F16D 2125/56; F16D 2125/30; F16D 65/097; F16D 65/0979
USPC .......................... 188/324, 329, 330, 338, 339
See application file for complete search history.

(56) References Cited

U.S. PATENT DOCUMENTS

| | | | | |
|---|---|---|---|---|
| 3,368,648 A | * | 2/1968 | Brownyer | F16D 51/22 188/206 A |
| 3,497,037 A | * | 2/1970 | Deibel | F16D 51/00 188/329 |
| 3,638,765 A | * | 2/1972 | Flaherty | F16D 65/0972 188/73.38 |
| 5,044,475 A | * | 9/1991 | Clark | F16D 51/20 188/205 R |
| 5,377,790 A | * | 1/1995 | Tsuruta | F16D 65/0972 188/205 A |
| 5,390,769 A | | 2/1995 | Bair | |
| 5,427,213 A | * | 6/1995 | Weiler | F16D 65/0006 188/250 B |
| 5,494,140 A | * | 2/1996 | Weiler | F16D 65/0006 188/250 B |
| 5,701,978 A | * | 12/1997 | Weiler | F16D 65/0979 188/234 |

(Continued)

*Primary Examiner* — Thomas W Irvin
(74) *Attorney, Agent, or Firm* — Cheryl L. Greenly; Brian E. Kondas; Eugene E. Clair

(57) ABSTRACT

A brake assembly apparatus is provided for a vehicle braking system. The brake assembly apparatus comprises a vibration damping sleeve for damping vibration between a first braking component and a second braking component. The sleeve includes (i) a first set of spring elements projecting toward a circumferential surface of the first braking component and tuned with a first preload against the circumferential surface of the first braking component, and (ii) a second set of spring elements projecting toward a circumferential surface of the second braking component and tuned with a second preload against the circumferential surface of the second braking component. The first and second sets of spring elements cooperate to damp vibration of certain frequencies between the first and second braking components based upon the first and second preloads.

16 Claims, 10 Drawing Sheets

(56) References Cited

U.S. PATENT DOCUMENTS

| | | | | |
|---|---|---|---|---|
| 5,704,452 A * | 1/1998 | Maligne | ............... | F16D 65/0979 |
| | | | | 188/73.38 |
| 5,706,916 A * | 1/1998 | Cortes Guasch | ..... | F16D 55/224 |
| | | | | 188/73.38 |
| 5,964,325 A * | 10/1999 | Davison | ................ | F16C 23/045 |
| | | | | 188/330 |
| 6,003,641 A | 12/1999 | Boehringer | | |
| 6,213,264 B1 * | 4/2001 | Walker | ................... | F16D 65/22 |
| | | | | 188/329 |
| 6,240,806 B1 * | 6/2001 | Morris | ................... | B60T 1/067 |
| | | | | 188/205 R |
| 6,550,780 B1 * | 4/2003 | DeLeeuw | ............... | F16C 33/74 |
| | | | | 277/549 |
| 6,634,469 B2 * | 10/2003 | Storzel | ................. | F16D 65/097 |
| | | | | 188/205 A |
| 6,959,792 B2 * | 11/2005 | Ashman | .............. | F16D 65/0979 |
| | | | | 188/234 |
| 7,152,722 B1 | 12/2006 | Banks | | |
| 7,537,224 B2 | 5/2009 | Morris | | |
| 8,696,208 B1 * | 4/2014 | Everline | ................ | F16D 65/22 |
| | | | | 384/129 |
| 9,303,703 B2 | 4/2016 | Banks | | |
| 9,611,909 B2 * | 4/2017 | Hayford | ................. | F16D 65/22 |
| 2006/0021834 A1 * | 2/2006 | Kwasniewski | ......... | F16D 51/20 |
| | | | | 188/329 |
| 2009/0107786 A1 * | 4/2009 | Eveley | ................. | B60T 17/088 |
| | | | | 188/325 |
| 2012/0145839 A1 | 6/2012 | Runels | | |
| 2016/0010709 A1 * | 1/2016 | Banks | .................... | F16D 65/28 |
| | | | | 188/325 |

\* cited by examiner

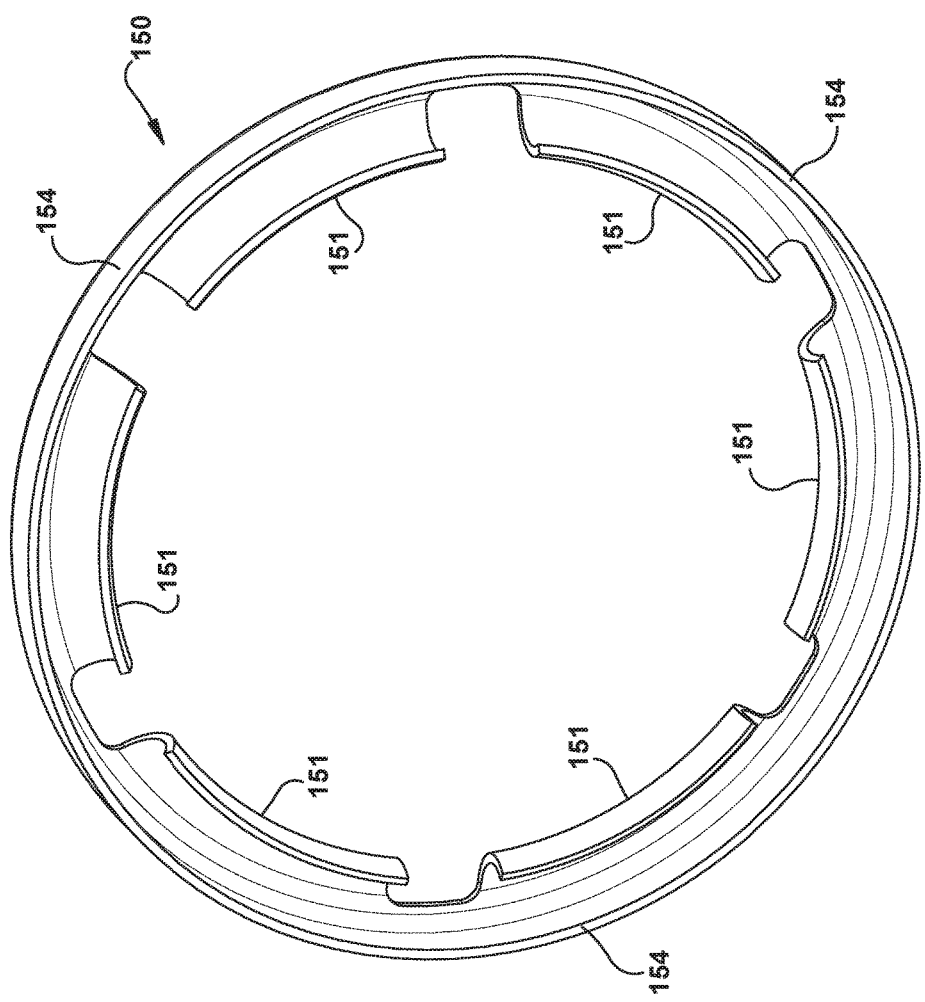

BRAKE ASSEMBLY APPARATUS FOR A VEHICLE BRAKING SYSTEM

BACKGROUND

The present application relates to vehicle braking systems, and is particularly directed to a brake assembly apparatus for a vehicle braking system, such as a heavy vehicle braking system that includes a drum brake assembly.

A typical drum brake assembly of a heavy vehicle, such as a truck, includes a brake shoe that engages a wheel drum to transmit braking torque through a brake spider to an axle. One end of the brake shoe is pivotable against an anchor pin that is attached to one side of the brake spider. A cam follower roller is disposed at the other end of the brake shoe. When a service brake application occurs, a camshaft located on an opposite side of the brake spider is actuated to rotate about its longitudinal central axis. As the camshaft rotates about its longitudinal central axis, a cam surface of an S-cam mounted on the camshaft acts against the cam follower roller to pivot the brake shoe about the anchor pin. As the brake shoe pivots about the anchor pin, brake lining of the brake shoe frictionally engages the wheel drum to transmit braking torque through the brake spider to the axle and thereby to decelerate and brake the vehicle.

During a service brake application, brake vibration may be created between the wheel drum and the brake shoe lining. The brake vibration between the wheel drum and the brake shoe lining could be transferred to other brake components, such as the camshaft, which may create an undesirable frequency vibration. This undesirable frequency vibration could then be transferred back (i.e., feedback vibration) through the brake shoe to the wheel drum to cause an objectionable level of noise. It would be desirable to damp such feedback vibration caused by the camshaft to reduce the objectionable level of noise to an unobjectionable level.

SUMMARY

In accordance with one example embodiment, a brake assembly apparatus is provided for a vehicle braking system. The brake assembly apparatus comprises a first braking component having a first longitudinal central axis and rotatable about the first longitudinal central axis. The brake assembly apparatus also comprises a second braking component having a second longitudinal central axis and rotatable about the second longitudinal central axis. The brake assembly apparatus further comprises a vibration damping sleeve disposed between the first braking component and the second braking component to damp vibration between the first and second braking components.

In accordance with another example embodiment, a brake assembly apparatus is provided for a vehicle braking system. The brake assembly apparatus comprises a vibration damping sleeve for damping vibration between a first braking component and a second braking component. The sleeve includes (i) a first set of spring elements projecting toward a circumferential surface of the first braking component and tuned with a first preload against the circumferential surface of the first braking component, and (ii) a second set of spring elements projecting toward a circumferential surface of the second braking component and tuned with a second preload against the circumferential surface of the second braking component. The first and second sets of spring elements cooperate to damp vibration of certain frequencies between the first and second braking components based upon the first and second preloads.

In accordance with yet another example embodiment, a brake assembly apparatus is provided for a vehicle braking system. The brake assembly apparatus comprises a first braking component and a second braking component. The brake assembly apparatus further comprises means for damping certain frequencies of feedback vibration through the first and second braking components to reduce an objectionable level noise caused by the certain frequencies of feedback vibration.

BRIEF DESCRIPTION OF THE DRAWINGS

FIG. 3 is a perspective view of a vibration damping sleeve of the brake assembly apparatus of FIGS. 1 and 2.

DETAILED DESCRIPTION

Figure 1:
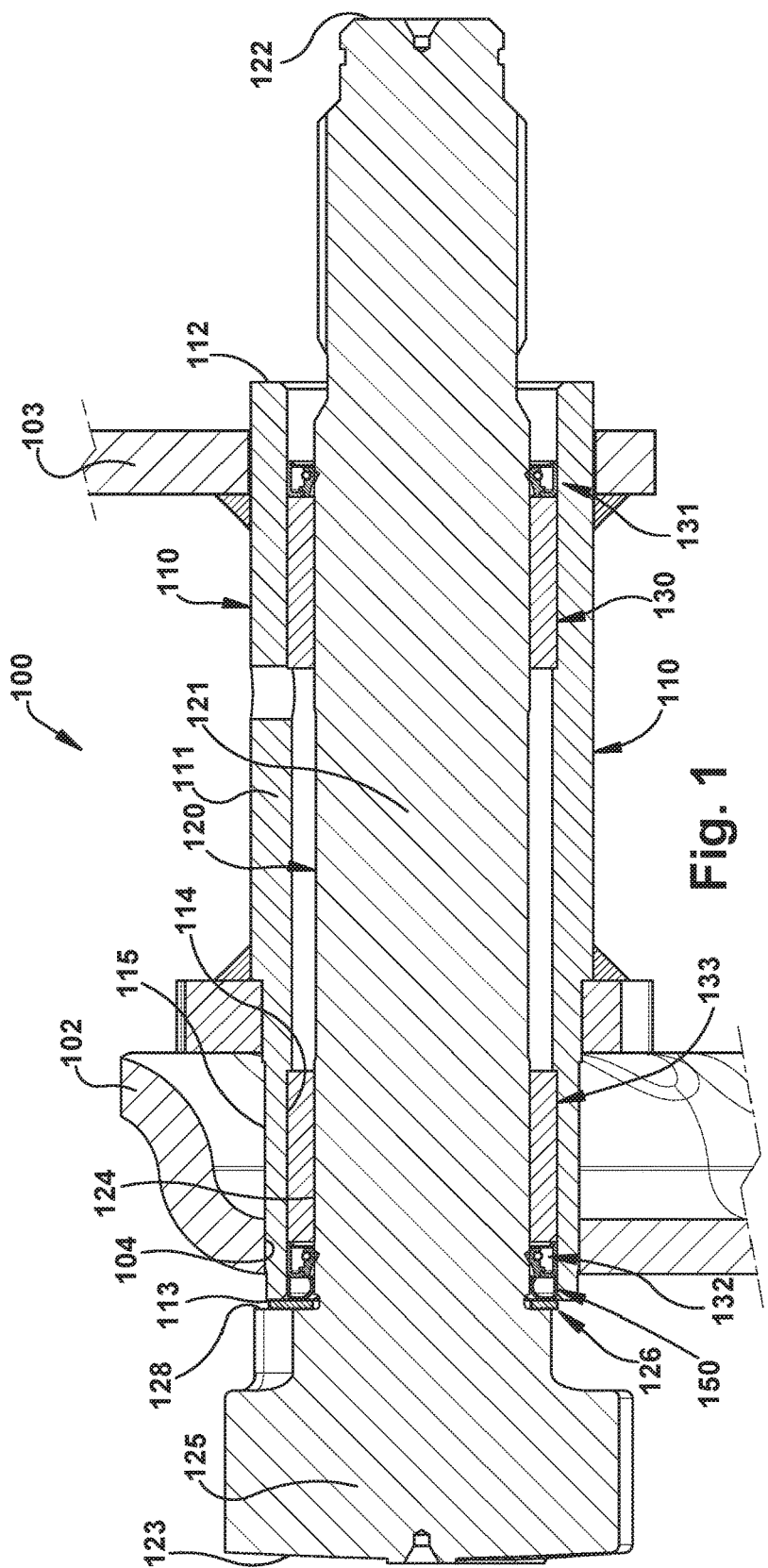
FIG. 1 is an elevation view of a vehicle braking system implementing a brake assembly apparatus constructed in accordance with an example embodiment.
Figure 2:
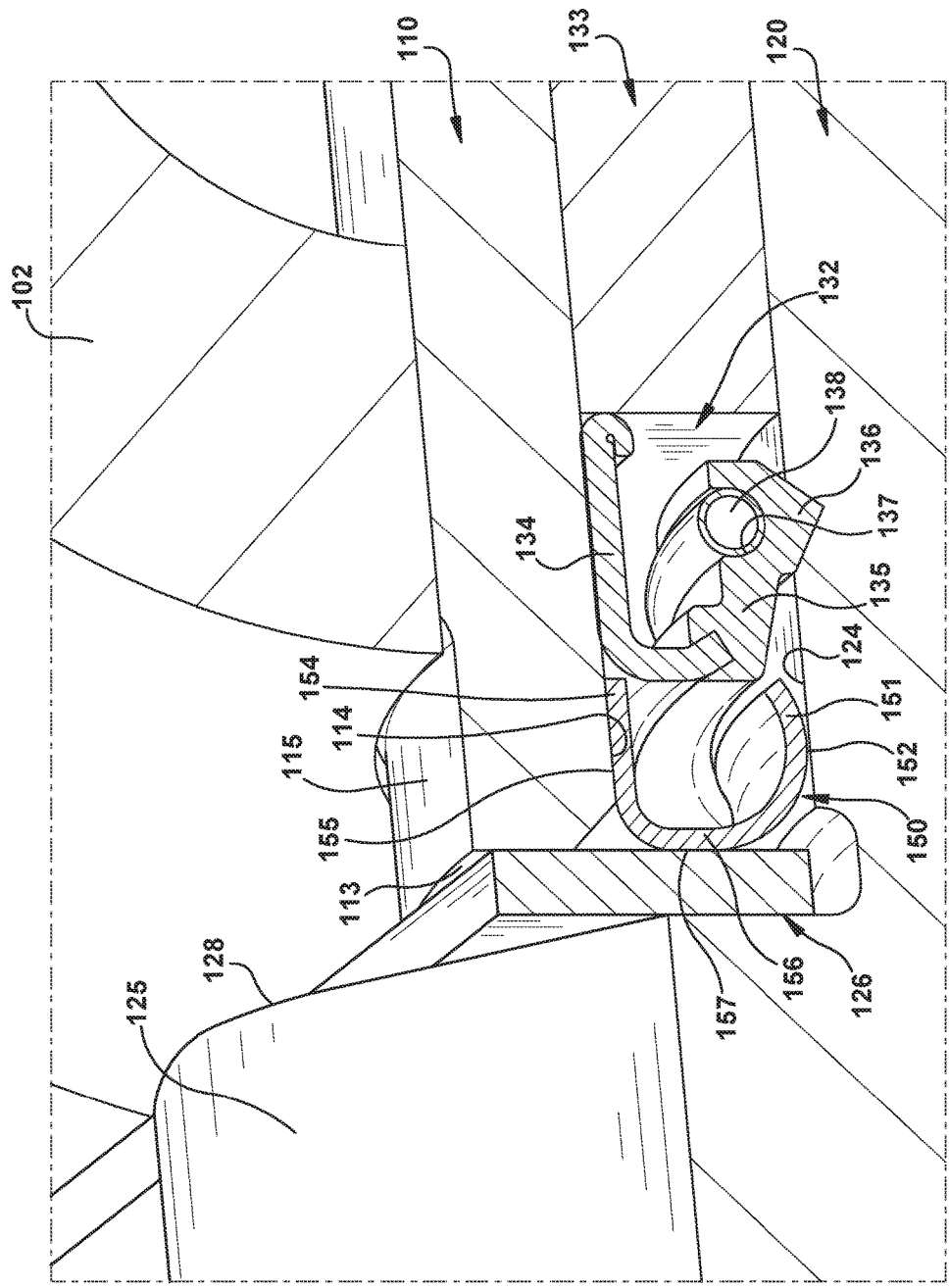
FIG. 2 is a perspective view of an enlarged portion of the brake assembly apparatus of FIG. 1.

Referring to example embodiment shown in FIGS. 1 and 2, brake assembly apparatus 100 is provided for a vehicle braking system, such as an air braking system of a commercial vehicle like a truck. Brake spider 102 is fixedly mounted to an axle (not shown) of the vehicle. Brake spider 102 has bore 104 in which cam tube 110 is disposed. Cam tube 110 supports bracket arm 103 which, in turn, supports an air actuator (not shown) in known manner.

Cam tube 110 has central portion 111 disposed between inboard end 112 that is distal to a wheel (also not shown) of the axle and outboard end 113 that is proximate to the wheel of the axle. Cam tube 110 has inner circumferential surface 114 facing radially inwards and outer circumferential surface 115 facing radially outwards. Cam tube 110 has a longitudinal central axis and is slip-fitted into bore 104 of brake spider 102 in known manner.

Camshaft 120 has central portion 121 disposed between inboard end 122 that is distal to the wheel of the axle and outboard end 123 that is proximate to the wheel of the axle. Camshaft 120 has outer circumferential surface 124 facing radially outwards. Camshaft 120 has a longitudinal central axis that is coincident with the longitudinal central axis of cam tube 110. S-cam 125 is disposed at outboard end 123 of camshaft 120. Cam washer 126 is sandwiched between shoulder portion 128 of camshaft 120 and outboard end 113 of cam tube 110.

First bearing 130 and second bearing 133 are disposed between outer circumferential surface 124 of camshaft 120 and inner circumferential surface 114 of cam tube 110. First bearing 130 is disposed at inboard end 122 of camshaft 120, and second bearing 133 is disposed at outboard end 123 of camshaft 120. First bearing 130 and second bearing 133 support camshaft 120 for rotation about its longitudinal central axis relative to cam tube 110 in conventional manner.

As shown in FIG. 1, one camshaft bracket seal 131 is press fit between cam tube 110 and camshaft 120 at one end of first bearing 130. Another camshaft bracket seal 132 is press fit between cam tube 110 and camshaft 120 at one end of second bearing 133. Construction of camshaft bracket seal 131 and camshaft bracket seal 132 are the same. For simplicity, only camshaft bracket seal 132 is described further.

As best shown in FIG. 2, camshaft bracket seal 132 includes outer portion 134 and inner portion 135 attached to outer portion 134. Outer portion 134 abuts inner circumferential surface 114 of cam tube 110, and inner portion 135 abuts outer circumferential surface 124 of camshaft 120. In particular, inner portion 135 has V-shaped projection 136 that abuts outer circumferential surface 124 of camshaft 120 in known manner. Inner portion 135 also has groove 137 in which garter spring 138 is disposed. Structure and operation of camshaft bracket seals 131, 132 are conventional and, therefore, will not be further described.

Vibration damping sleeve 150 is disposed between cam tube 110 and camshaft 120. Sleeve 150 has a longitudinal central axis that is coincident with the longitudinal axis of cam tube 110 and the longitudinal central axis of camshaft 120. A perspective view of the vibration damping sleeve 150 is illustrated in FIG. 3.

Referring to FIGS. 2 and 3, sleeve 150 includes first portions 151 having surfaces 152 (only one first portion 151 and only one surface 152 shown in FIG. 2) that contact outer circumferential surface 124 of camshaft 120, and second portion 154 having surface 155 that contacts inner circumferential surface 114 of cam tube 110. Connecting portion 156 interconnects first and second portions 151, 154, and has transverse surface 157 that faces cam washer 126. Optionally, transverse surface 157 contacts cam washer 126 to prevent or minimize axial movement of sleeve 150.

During cam assembly, sleeve 150 is press fit into a space defined between cam tube 110 and camshaft 120 and between cam washer 126 and camshaft bracket seal 132. First portions 151 of sleeve 150 are formed spring elements or fingers that are expanded during cam assembly to create a preload of surfaces 152 against a cam journal on outer circumferential surface 124 of camshaft 120 to provide damping of camshaft or S-cam vibration. Each of surfaces 152 preloaded against the cam journal on outer circumferential surface 124 of camshaft 120 is a metal-to-metal interface for abrasion resistance, and is a line contact to reduce friction. Although the above description describes sleeve 150 being press fit between cam tube 110 and camshaft 120, it is conceivable that spring elements could be added to surface 155 of second portion 154 of sleeve 150 to provide retention of sleeve 150 between cam tube 110 and camshaft 120 instead of press fitting of sleeve 150.

Figure 4A:
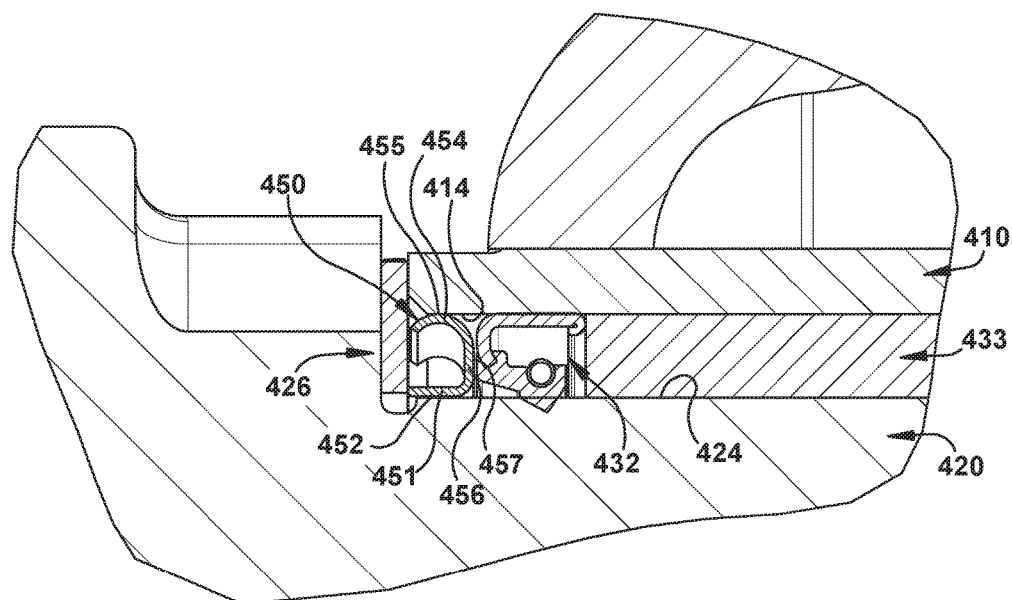
FIG. 4A is an elevational view similar to FIG. 1, and showing a brake assembly apparatus constructed in accordance with another example embodiment.

Another example embodiment is illustrated in FIG. 4A. Vibration damping sleeve 450 is disposed between cam tube 410 and camshaft 420, and bearing 433 is disposed between cam tube 410 and camshaft 420. Sleeve 450 has a longitudinal central axis that is coincident with the longitudinal axis of cam tube 410 and the longitudinal central axis of camshaft 420. A perspective view of vibration damping sleeve 450 is illustrated in FIG. 4B.

Figure 4B:
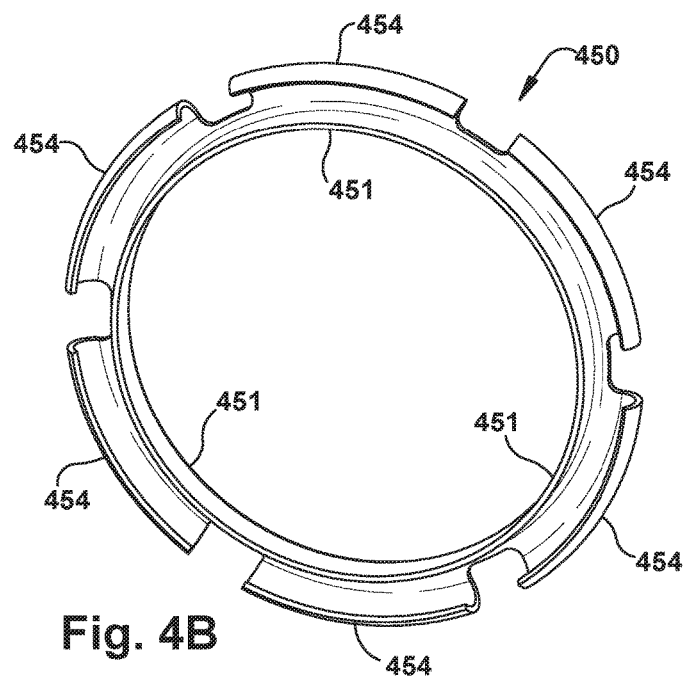
FIG. 4B is a perspective view of a vibration damping sleeve of the brake assembly apparatus of FIG. 4A.

Referring to FIGS. 4A and 4B, sleeve 450 includes first portion 451 having surface 452 that contacts outer circumferential surface 424 of camshaft 420, and second portions 454 having surfaces 455 (only one second portion 454 and only one surface 455 shown in FIG. 4A) that contact inner circumferential surface 414 of cam tube 410. Connecting portion 456 interconnects first and second portions 451, 454, and has transverse surface 457 that faces camshaft bracket seal 432. Optionally, transverse surface 457 contacts camshaft bracket seal 432 to prevent or minimize axial movement of sleeve 450.

During cam assembly, sleeve 450 is press fit into a space defined between cam tube 410 and camshaft 420 and between cam washer 426 and camshaft bracket seal 432. Second portions 454 of sleeve 450 are formed spring elements or fingers that are compressed during cam assembly to create a preload of surfaces 455 against inner circumferential surface 414 of cam tube 410 to provide damping of camshaft or S-cam vibration. Each of surfaces 455 preloaded against inner circumferential surface 414 of cam tube 410 is a metal-to-metal interface for abrasion resistance, and is a line contact to reduce friction. Although the above description describes sleeve 450 being press fit between cam tube 410 and camshaft 420, it is conceivable that spring elements could be added to surface 452 of first portion 451 of sleeve 450 to provide retention of sleeve 450 between cam tube 410 and camshaft 420 instead of press fitting of sleeve 450.

Figure 5A:
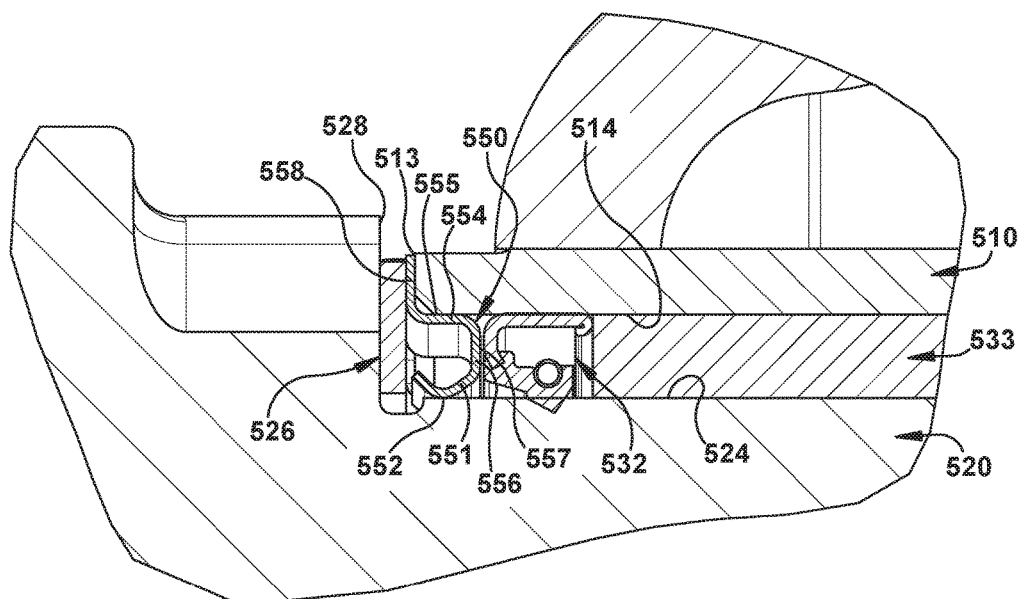
FIG. 5A is an elevational view similar to FIG. 1, and showing a brake assembly apparatus constructed in accordance with another example embodiment.

Another example embodiment is illustrated in FIG. 5A. Vibration damping sleeve 550 is disposed between cam tube 510 and camshaft 520, and bearing 533 is disposed between cam tube 510 and camshaft 520. Sleeve 550 has a longitudinal central axis that is coincident with the longitudinal axis of cam tube 510 and the longitudinal central axis of camshaft 520. A perspective view of vibration damping sleeve 550 is illustrated in FIG. 5B.

Figure 5B:
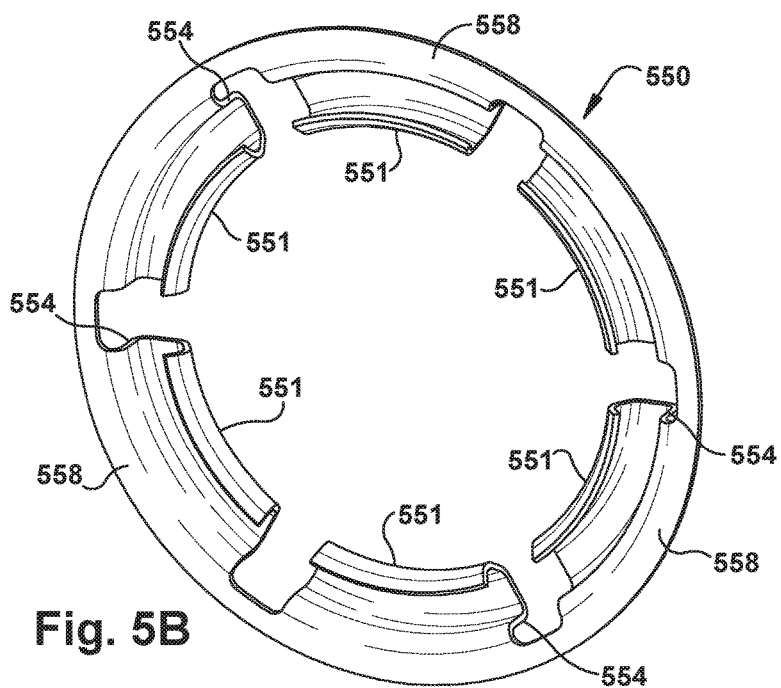
FIG. 5B is a perspective view of a vibration damping sleeve of the brake assembly apparatus of FIG. 5A.

Referring to FIGS. 5A and 5B, sleeve 550 includes first portions 551 having surfaces 552 (only one first portion 551 and only one surface 552 shown in FIG. 5A) that contact outer circumferential surface 524 of camshaft 520, and second portions 554 having surfaces 555 (only one second portion 554 and only one surface 555 shown in FIG. 5A) that contact inner circumferential surface 514 of cam tube 510. Connecting portion 556 interconnects first and second portions 551, 554, and has transverse surface 557 that faces camshaft bracket seal 532. Flange portion 558 extends from second portions 554, and is sandwiched between cam washer 526 and outboard end 513 of cam tube 510 to prevent or minimize axial movement of sleeve 550.

During cam assembly, sleeve 550 is press fit into a space defined between cam tube 510 and camshaft 520. Second portions 551 of sleeve 550 are formed spring elements or fingers that are expanded during cam assembly to create a preload of surfaces 552 against a cam journal on outer circumferential surface 524 of camshaft 520 to provide damping of camshaft or S-cam vibration. Each of surfaces 552 preloaded against the cam journal on outer circumferential surface 524 of camshaft 520 is a metal-to-metal interface for abrasion resistance, and is a line contact to reduce friction.

Figure 6A:
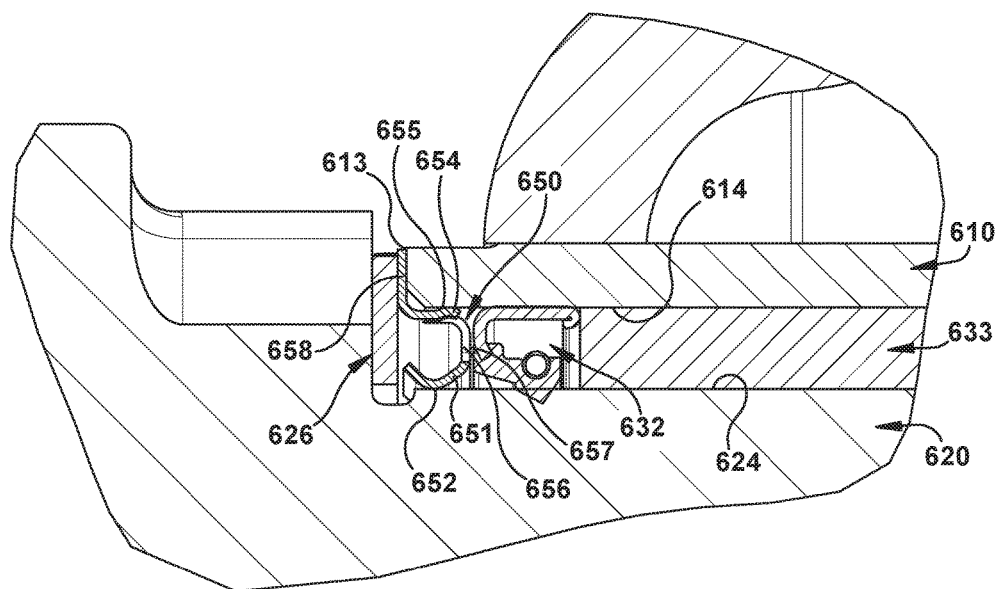
FIG. 6A is an elevational view similar to FIG. 1, and showing a brake assembly apparatus constructed in accordance with another example embodiment.

Another example embodiment is illustrated in FIG. 6A. Vibration damping sleeve 650 is disposed between cam tube 610 and camshaft 620, and bearing 633 is disposed between cam tube 610 and camshaft 620. Sleeve 650 has a longitudinal central axis that is coincident with the longitudinal axis of cam tube 610 and the longitudinal central axis of camshaft 620. A perspective view of vibration damping sleeve 650 is illustrated in FIG. 6B.

Figure 6B:
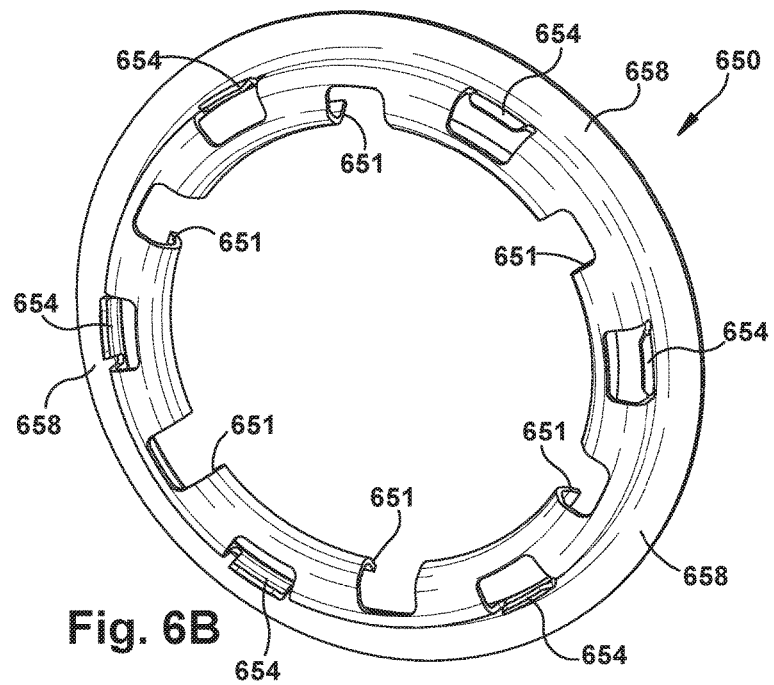
FIG. 6B is a perspective view of a vibration damping sleeve of the brake assembly apparatus of FIG. 6A.

Referring to FIGS. 6A and 6B, sleeve 650 includes first portions 651 having surfaces 652 (only one first portion 651 and only one surface 652 shown in FIG. 6A) that contacts outer circumferential surface 624 of camshaft 620, and second portions 654 having surfaces 655 (only one second portion 654 and only one surface 655 shown in FIG. 6A) that contacts inner circumferential surface 614 of cam tube 610. Connecting portion 656 interconnects first and second portions 651, 654, and has transverse surface 657 that faces camshaft bracket seal 632. Flange portion 658 extends from second portions 654, and is sandwiched between cam washer 626 and outboard end 613 of cam tube 610 to prevent or minimize axial movement of sleeve 650.

During cam assembly, sleeve 650 is inserted into a space defined between cam tube 610 and camshaft 620. No press fit is required. First portions 651 of sleeve 650 are formed spring elements or fingers that are expanded during cam assembly to create a preload of surfaces 652 against a cam journal on outer circumferential surface 624 of camshaft 620 to provide damping of camshaft or S-cam vibration. Each of surfaces 652 of sleeve 650 is a metal-to-metal interface for abrasion resistance, and is a line contact to reduce friction. In addition, second portions 654 of sleeve 650 are formed spring elements or fingers that are compressed during cam assembly to create a preload of surfaces 655 against inner circumferential surface 614 of cam tube 610 to provide damping of camshaft or S-cam vibration. Accordingly, in the example embodiment of FIGS. 6A and 6B, two sets of surfaces (i.e., surfaces 652 of first portions 651 and surfaces 655 of second portions 654) of sleeve 650 provide damping of camshaft or S-cam vibration.

Figure 7A:
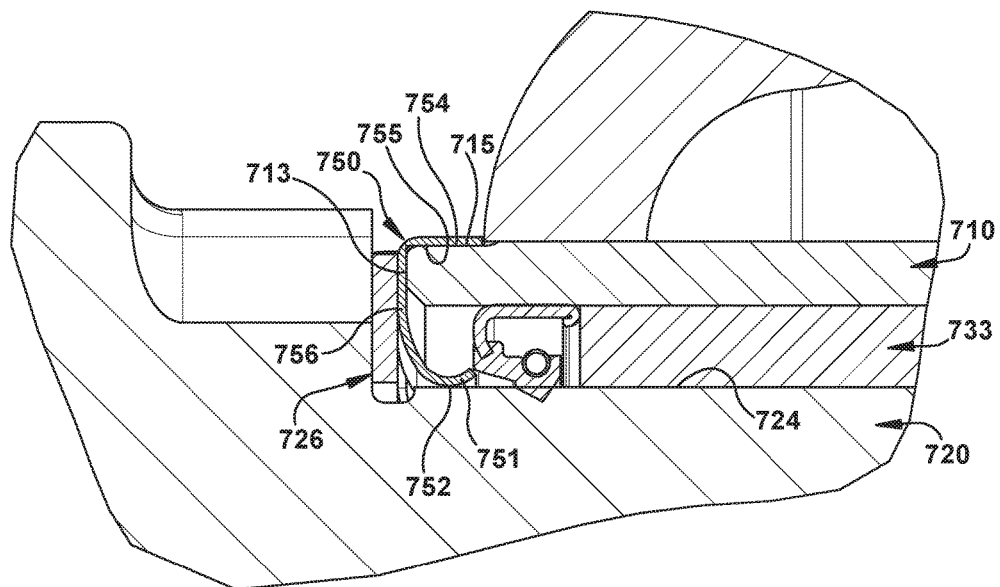
FIG. 7A is an elevational view similar to FIG. 1, and showing a brake assembly apparatus constructed in accordance with another example embodiment.

Another example embodiment is illustrated in FIG. 7A. Vibration damping sleeve 750 is disposed between cam tube 710 and camshaft 720, and bearing 733 is disposed between cam tube 710 and camshaft 720. Sleeve 750 has a longitudinal central axis that is coincident with the longitudinal axis of cam tube 710 and the longitudinal central axis of camshaft 720. A perspective view of the vibration damping sleeve 750 is illustrated in FIG. 7B.

Figure 7B:
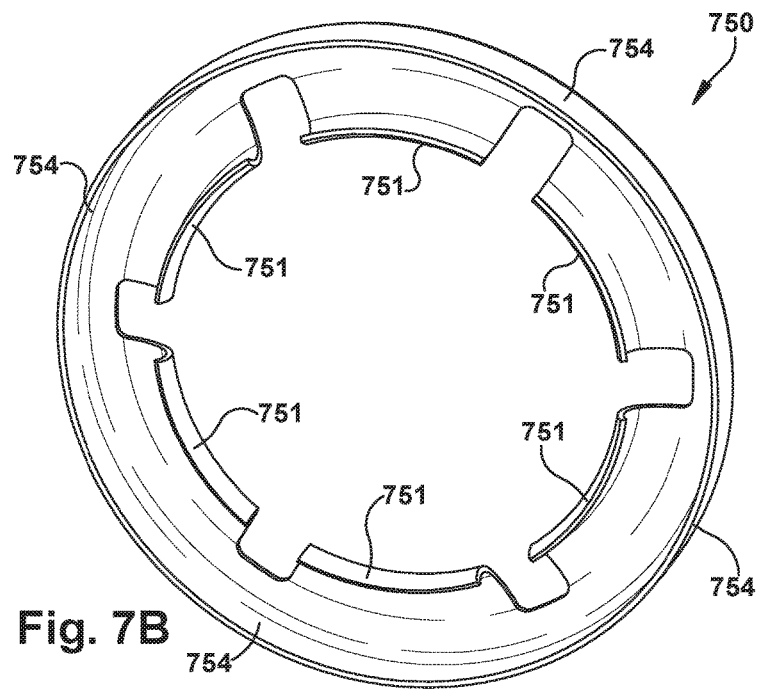
FIG. 7B is a perspective view of a vibration damping sleeve of the brake assembly apparatus of FIG. 7A.

Referring to FIGS. 7A and 7B, sleeve 750 includes first portions 751 having surfaces 752 (only one first portion 751 and only one surface 752 shown in FIG. 7A) that contact outer circumferential surface 724 of camshaft 720, and second portion 754 having surface 755 that contacts outer circumferential surface 715 of cam tube 710. Connecting portion 756 interconnects first and second portions 751, 754, and is sandwiched between cam washer 726 and outboard end 713 of cam tube 710 to prevent or minimize axial movement of sleeve 750.

During cam assembly, sleeve 750 is externally pressed over cam tube 710. First portions 751 of sleeve 750 are formed spring elements or fingers that are expanded during cam assembly to create a preload of surfaces 752 against a cam journal on outer circumferential surface 724 of camshaft 720 to provide damping of camshaft or S-cam vibration. Each of surfaces 752 of sleeve 750 is a metal-to-metal interface for abrasion resistance, and is a line contact to reduce friction.

Figure 8A:
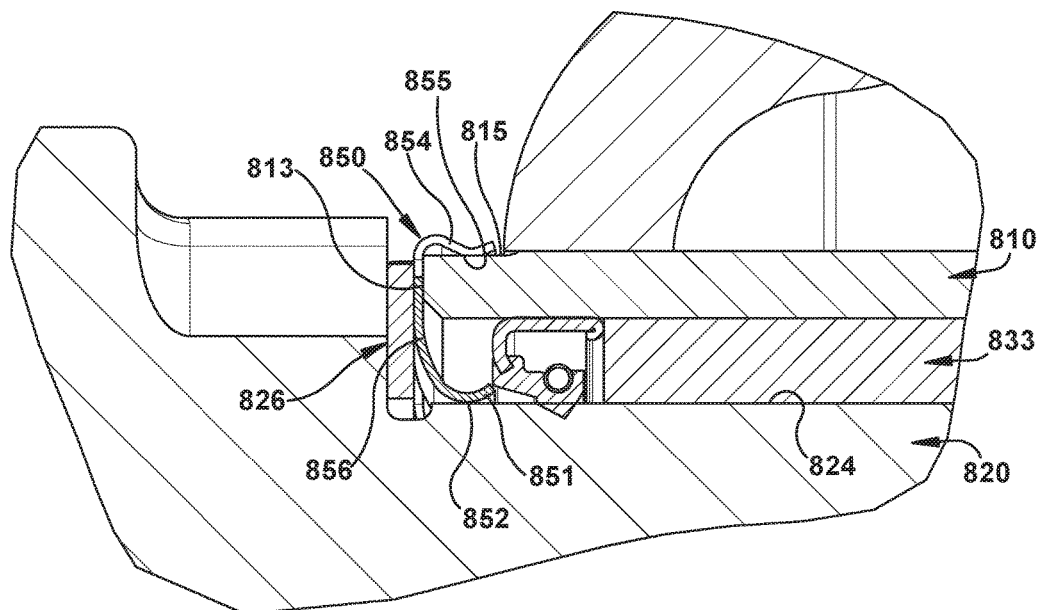
FIG. 8A is an elevational view similar to FIG. 1, and showing a brake assembly apparatus constructed in accordance with another example embodiment.

Another example embodiment is illustrated in FIG. 8A. Vibration damping sleeve 850 is disposed between cam tube 810 and camshaft 820, and bearing 833 is disposed between cam tube 810 and camshaft 820. Sleeve 850 has a longitudinal central axis that is coincident with the longitudinal axis of cam tube 810 and the longitudinal central axis of camshaft 820. A perspective view of the vibration damping sleeve 850 is illustrated in FIG. 8B.

Figure 8B:
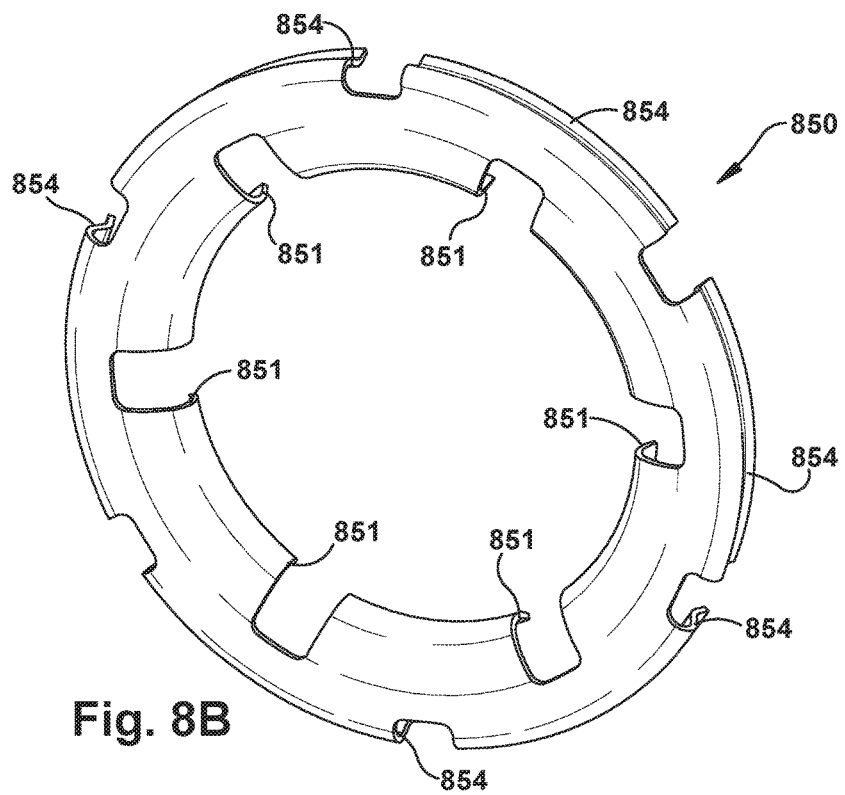
FIG. 8B is a perspective view of a vibration damping sleeve of the brake assembly apparatus of FIG. 8A.

Referring to FIGS. 8A and 8B, sleeve 850 includes first portions 851 having surfaces 852 (only one first portion 851 and only one surface 852 shown in FIG. 8A) that contact outer circumferential surface 824 of camshaft 820, and second portions 854 having surfaces 855 (only one second portion 854 and only one surface 855 shown in FIG. 8A) that contact outer circumferential surface 815 of cam tube 810. Connecting portion 856 interconnects first and second portions 851, 854, and is sandwiched between cam washer 826 and outboard end 813 of cam tube 810 to prevent or minimize axial movement of sleeve 850.

During cam assembly, sleeve 850 is externally pressed over cam tube 810. First portions 851 of sleeve 850 are formed spring elements or fingers that are expanded during cam assembly to create a preload of surfaces 852 against a cam journal on outer circumferential surface 824 of camshaft 820 to provide damping of camshaft or S-cam vibration. Each of surfaces 852 of sleeve 850 is a metal-to-metal interface for abrasion resistance, and is a line contact to reduce friction. In addition, second portions 854 of sleeve 850 are formed spring elements or fingers that are expanded during cam assembly to create a preload of surfaces 855 against outer circumferential surface 815 of cam tube 810 to provide damping of camshaft or S-cam vibration. Each of surfaces 855 of sleeve 850 is a metal-to-metal interface for abrasion resistance, and is a line contact to reduce friction. Accordingly, in the example embodiment of FIGS. 8A and 8B, two sets of surfaces (i.e., surfaces 852 of first portions 851 and surfaces 855 of second portions 854) of sleeve 850 provide damping of camshaft or S-cam vibration.

Figure 9A:
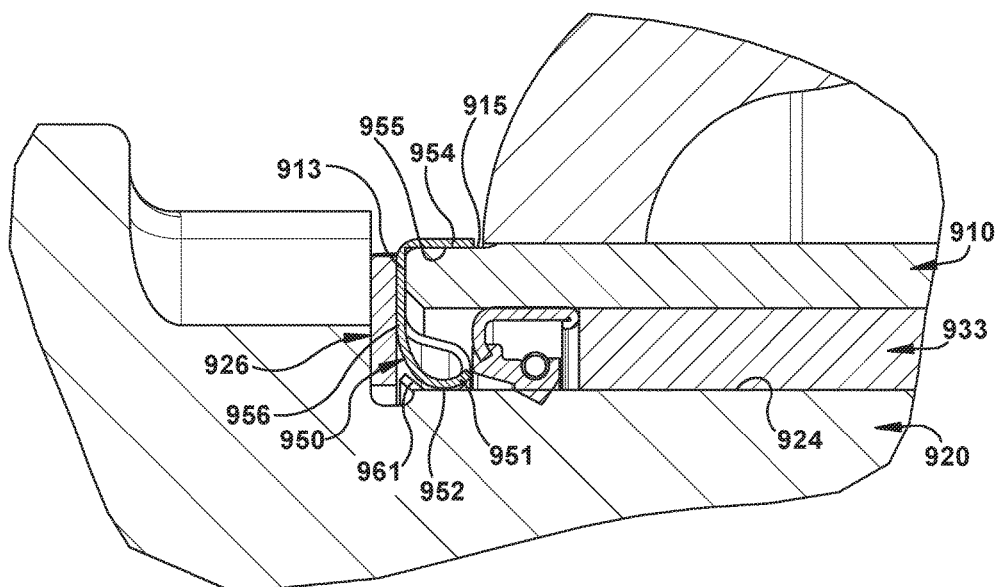
FIG. 9A is an elevational view similar to FIG. 1, and showing a brake assembly apparatus constructed in accordance with another example embodiment.

Another example embodiment is illustrated in FIG. 9A. Vibration damping sleeve 950 is disposed between cam tube 910 and camshaft 920, and bearing 933 is disposed between cam tube 910 and camshaft 920. Sleeve 950 has a longitudinal central axis that is coincident with the longitudinal axis of cam tube 910 and the longitudinal central axis of camshaft 920. A perspective view of the vibration damping sleeve 950 is illustrated in FIG. 9B.

Figure 9B:
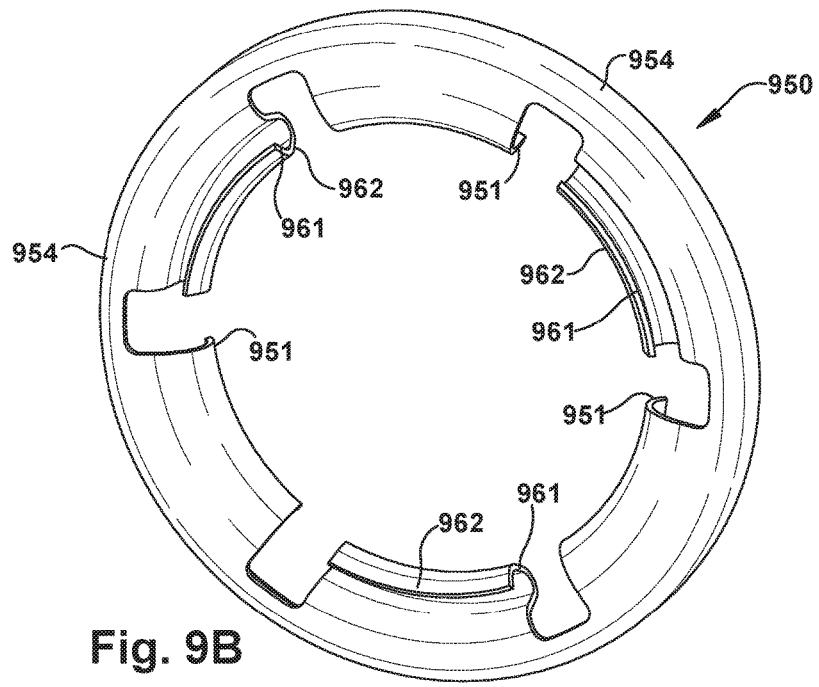
FIG. 9B is a perspective view of a vibration damping sleeve of the brake assembly apparatus of FIG. 9A.

Referring to FIGS. 9A and 9B, sleeve 950 includes first portions 951 having surfaces 952 (only one first portion 951 and only one surface 952 shown in FIG. 9A) that contact outer circumferential surface 924 of camshaft 920, and second portion 954 having surface 955 that contacts outer circumferential surface 915 of cam tube 910. Sleeve 950 further includes third portions 961 having surfaces 962 (as shown in FIG. 9B) that also contact outer circumferential surface 924 of camshaft 920. Connecting portion 956 interconnects second portion 954 with first and third portions 951, 961, and is sandwiched between cam washer 926 and outboard end 913 of cam tube 910 to prevent or minimize axial movement of sleeve 950.

During cam assembly, sleeve 950 is externally pressed over cam tube 910. Both first portions 951 and third portions 961 of sleeve 950 are formed spring elements or fingers that are expanded during cam assembly to create a preload against a cam journal on outer circumferential surface 924 of camshaft 920 to provide damping of camshaft or S-cam vibration. The amount of preload provided by first portions 951 and the amount of preload provided by third portions 961 could be different from each other, or could be the same. Each of surfaces 952 and surfaces 962 of sleeve 950 is a metal-to-metal interface for abrasion resistance, and is a line contact to reduce friction.

Figure 10A:
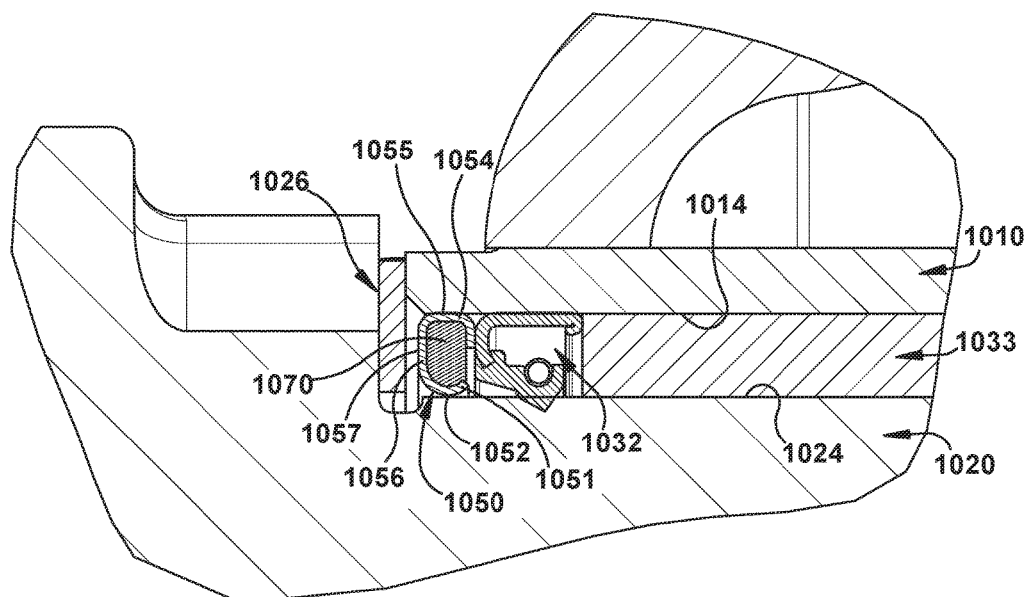
FIG. 10A is an elevational view similar to FIG. 1, and showing a brake assembly apparatus constructed in accordance with another example embodiment.

Another example embodiment is illustrated in FIG. 10A. Vibration damping sleeve 1050 is disposed between cam tube 1010 and camshaft 1020, and bearing 1033 is disposed between cam tube 1010 and camshaft 1020. Sleeve 1050 has a longitudinal central axis that is coincident with the longitudinal axis of cam tube 1010 and the longitudinal central axis of camshaft 1020. A perspective view of the vibration damping sleeve 1050 is illustrated in FIG. 10B.

Figure 10B:
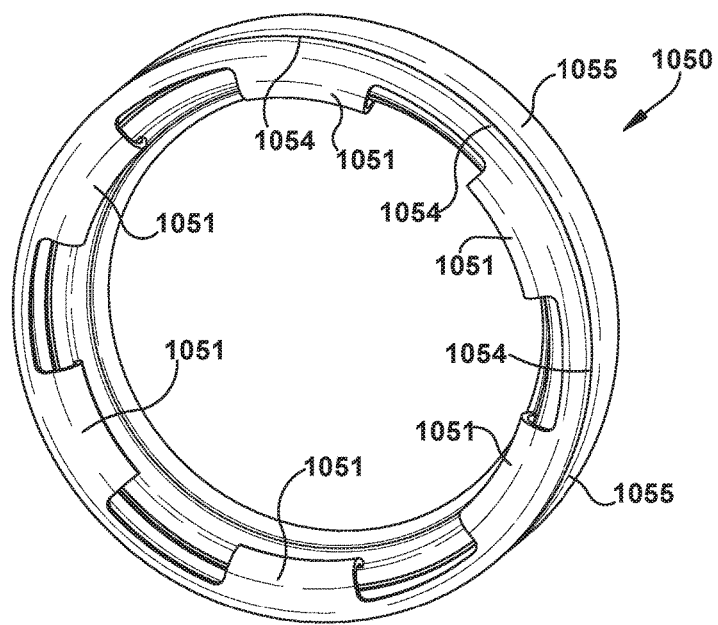
FIG. 10B is a perspective view of a vibration damping sleeve of the brake assembly apparatus of FIG. 10A.

Referring to FIGS. 10A and 10B, sleeve 1050 includes first portions 1051 having surfaces 1052 (only one first portion 1051 and only one surface 1052 shown in FIG. 10A) that contact outer circumferential surface 1024 of camshaft 1020, and second portion 1054 having surface 1055 that contacts inner circumferential surface 1014 of cam tube 1010. Connecting portion 1056 interconnects first and second portions 1051, 1054, and has transverse surface 1057 that faces cam washer 1026. Optionally, transverse surface 1057 may contact cam washer 1026 to prevent or minimize axial movement of sleeve 1050.

Sleeve 1050 is integrated with camshaft bracket seal 1032 to provide a single component. The material of sleeve 1050 can be the same as material of camshaft bracket seal 1032, or can be a material that is different from material of camshaft bracket seal 1032. Optionally, elastomer 1070 is inserted into sleeve 1050, such as a cavity location shown in FIG. 10A, to provide additional damping. Elastomer 1070 may be molded in the form of a ring, and may be inserted at other locations of sleeve 1050. By providing sleeve 1050 and camshaft bracket seal 1032 as a single component, both part count and envelope required are reduced.

During cam assembly, the single-integrated component of sleeve 1050 and camshaft bracket seal 1032 is press fit between cam tube 1010 and camshaft 1020. First portions 1051 of sleeve 1050 are formed spring elements or fingers that are expanded during cam assembly to create a preload of surfaces 1052 against a cam journal on outer circumferential surface 1024 of camshaft 1020 to provide damping of camshaft or S-cam vibration. Each of surfaces 1052 preloaded against the cam journal on outer circumferential surface 1024 of camshaft 1020 is a metal-to-metal interface for abrasion resistance, and is a line contact to reduce friction. Although the above description describes sleeve 1050 being press fit between cam tube 1010 and camshaft 1020, it is conceivable that spring elements could be added to surface 1055 of second portion 1054 to provide retention of sleeve 1050 between cam tube 1010 and camshaft 1020 instead of press fitting of sleeve 1050.

During a service brake application, friction between brake lining of a brake shoe and surface of a wheel drum can create vibrations that can be transferred through the brake shoe into the camshaft and the S-cam. At certain vibrational frequencies (e.g., between 800 Hz and 3000 Hz), the camshaft or the S-cam, or both, can become excited and cause feedback vibrations back to the wheel drum mounted on the axle. These feedback vibrations can cause the wheel drum to reach one or more frequencies that can create objectionable noises.

A vibration damping sleeve constructed in accordance with the above-described example embodiments damps certain or undesirable frequency vibration from the camshaft or the S-cam that could be transferred back through the brake shoe to the wheel drum. One or more frequencies of feedback vibration from the camshaft or the S-cam can be in the frequency range between 800 Hz and 3000 Hz, for example. The vibration damping sleeve functions to damp the one or more frequencies of feedback vibration and thereby to reduce the potential of the camshaft or the S-cam to become excited. More specifically, the combination of a first set of spring elements or fingers and a second set of spring elements or fingers of vibration damping sleeve provides a preloaded radial force that damps feedback vibration of the camshaft or the S-cam during a service brake application. The preloaded radial force alters the frequency of feedback vibration of the camshaft or the S-cam during a service brake application. By altering the frequency of feedback vibration of the camshaft or the S-cam, the magnitude of feedback vibration is reduced, resulting in reduced objectionable noise caused by such feedback vibration.

Also, a vibration damping sleeve constructed in accordance with the above example embodiments may comprise formed stainless steel, spring steel, or other metals, for examples. As another example, it is conceivable that the vibration damping sleeve may comprise all elastomeric material.

It should be apparent that damping characteristics of a vibration damping sleeve constructed in accordance with above-described example embodiments are capable of being tuned to match frequency damping requirements of a variety of brake and suspension applications. The damping characteristics of the vibration damping sleeve can be tuned for a particular application by varying the contour, size, shape, cross-section, number of spring or finger elements, and material thickness, for example, of the spring elements or fingers to vary the radial preload forces between the cam tube and the camshaft. The sleeve can contain any number of circumferential spring elements or fingers that radially engage a cam journal and cooperate to damp vibrations at certain frequencies. The sleeve can be modified to enhance damping effectiveness as well as manufacturability and cost. Accordingly, various configurations are possible for tuning to damp certain frequencies of vibration based upon frequency damping requirements of a particular application.

It should also be apparent that a vibration damping sleeve constructed in accordance with above-described example embodiments is a simple, low-cost component that is easy to manufacture. The vibration damping sleeve is a light-weight component within a current space envelope. In particular, the vibration damping sleeve fits into a space defined between a cam tube which is an anchored component, and a cam journal which is a controlled surface. The size of the defined space between the cam tube and the cam journal is sufficient to accommodate thickness of the vibration damping sleeve. Accordingly, the vibration damping sleeve is cost effective and easy to install in retrofit applications as well as new production applications.

Although the above description describes a vibration damping sleeve in the form of a ring component, it is conceivable that the sleeve can comprise a number of separate components. For example, the vibration damping sleeve can be constructed of two separate arcuate-shaped components.

Also, although the above description describes one vibration damping sleeve installed at the outboard end of the cam tube, it is conceivable that any number of vibration damping sleeves can installed along the extent of the cam tube. For example, two vibration damping sleeves can be installed, one at the outboard end of the cam tube and the other one at the inboard end of the cam tube. As another example, three vibration damping sleeves can be installed, one at the outboard end of the cam tube, another one at the inboard end of the cam tube, and the remaining one between the outboard end of the cam tube and the inboard end of the cam tube. The number of sleeves and their locations along the extent of the cam tube can be selected to optimize vibration damping for a particular application.

Further, although the above description describes the example embodiment of FIGS. 10A and 10B as optionally including a number of elastomers for additional damping, it is conceivable that other embodiments including the example embodiments disclosed herein can also optionally include a number of elastomers for additional damping. For example, an elastomer can be filled in a cavity of a first set of spring elements, and another elastomer can be filled in a cavity of a second set of spring elements.

Also, although the above description describes the vibration damping sleeve being used in a heavy vehicle such as a truck, it is conceivable that the vibration damping sleeve may be used in other types of commercial vehicles, such as busses for example.

While the present disclosure has been illustrated by the description of example processes and system components, and while the various processes and components have been described in detail, applicant does not intend to restrict or in any way limit the scope of the appended claims to such detail. Additional modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general concept.

What is claimed is:

1. A brake assembly apparatus for a vehicle braking system, the brake assembly apparatus comprising:
    a first braking component having a first longitudinal central axis and rotatable about the first longitudinal central axis;
    a second braking component having a second longitudinal central axis and rotatable about the second longitudinal central axis; and
    a vibration damping sleeve disposed between the first braking component and the second braking component and tunable to define a frequency range in which undesirable feedback frequencies of vibration between the first and second braking components are damped, wherein the vibration damping sleeve includes (i) a first set of protruding spring elements that project towards the first braking component in a first direction that is transverse to the first longitudinal central axis, and (ii) a second set of protruding spring elements that project towards the second braking component in a second direction that is transverse to the second longitudinal central axis.

2. A brake assembly apparatus according to claim 1, wherein (i) each protruding spring element of the first set of protruding spring elements includes a radially-protruding surface that radially engages a surface of the first braking component to provide a first preloaded radial force against the first braking component, and (ii) each protruding spring element of the second set of protruding spring elements includes a radially-protruding surface that radially engages a surface of the second braking component to provide a second preloaded radial force against the second braking component.

3. A brake assembly apparatus according to claim 1, wherein (i) the first longitudinal central axis and the second longitudinal central axis are coincident, and (ii) the vibration damping sleeve has a third longitudinal central axis that is coincident with the first and second longitudinal central axes.

4. A brake assembly apparatus according to claim 3, wherein (i) the first braking component includes a camshaft, (ii) the second braking component includes a cam tube having an outboard end and an inboard end, and (iii) the vibration damping sleeve includes a single-piece ring around at least a portion of the camshaft and installed at the outboard end of the cam tube.

5. A brake assembly apparatus according to claim 4, wherein (i) the single-piece ring includes the first set of protruding spring elements and the second set of protruding spring elements, (ii) each protruding spring element of the first set of protruding spring elements project towards an outer circumferential surface of the camshaft and has a radially-protruding surface that radially engages the outer circumferential surface of the camshaft, and (iii) each protruding spring element of the second set of protruding spring elements project towards a circumferential surface of the cam tube and has a radially-protruding surface that radially engages the circumferential surface of the cam tube.

6. A brake assembly apparatus according to claim 5, wherein the second set of spring elements project toward an inner circumferential surface of the cam tube, and the second surface engages the inner circumferential surface of the cam tube.

7. A brake assembly apparatus according to claim 5, wherein the radially projecting surface of each protruding spring element of the second set of protruding spring elements project towards an outer circumferential surface of the cam tube and radially engages the outer circumferential surface of the cam tube.

8. A brake assembly apparatus according to claim 5, wherein the single-piece ring includes (i) a corresponding connecting surface that extends transverse to each radially-protruding surface of each protruding spring element of the first set of protruding spring elements, and (ii) a corresponding connecting surface that extends transverse to each radially-protruding surface of each protruding spring element of the second set of protruding spring elements.

9. A brake assembly apparatus according to claim 5, further comprising a cam washer disposed between the camshaft and the cam tube at one end of the cam tube.

10. A brake assembly apparatus according to claim 9, wherein the single-piece ring includes (i) a corresponding connecting surface that extends transverse to each radially-protruding surface of each protruding spring element of the first set of protruding spring elements, and (ii) a corresponding connecting surface that extends transverse to each radially-protruding surface of each protruding spring element of the second set of protruding spring elements.

11. A brake assembly apparatus according to claim 4, further comprising another vibration damping sleeve that includes a ring around at least another portion of the camshaft and installed at the inboard end of the cam tube.

12. A brake assembly apparatus for a vehicle braking system, the brake assembly apparatus comprising:
a single-piece vibration damping sleeve made of same material for damping vibration between a first braking component and a second braking component, wherein the single-piece vibration damping sleeve includes (i) a first set of spring elements projecting toward a circumferential surface of the first braking component and tuned with a first preloaded radial force against the circumferential surface of the first braking component, and (ii) a second set of spring elements projecting toward a circumferential surface of the second braking component and tuned with a second preloaded radial force against the circumferential surface of the second braking component, wherein the first and second preloaded radial forces associated with the first and second sets of spring elements cooperate to damp feedback vibration of undesirable frequencies between the first and second braking components.

13. A brake assembly apparatus according to claim 12, wherein (i) the first braking component includes a camshaft, (ii) the second braking component includes a cam tube, and (iii) the vibration damping sleeve is integrated with a camshaft bracket seal.

14. A brake assembly apparatus according to claim 12, wherein (i) the first set of spring elements includes a first radially-protruding surface for radially engaging the circumferential surface of the first braking component, and (ii) the second set of spring elements includes a second radially-protruding surface for radially engaging the circumferential surface of the second braking component.

15. A brake assembly apparatus according to claim 14, wherein the single-piece vibration damping sleeve includes a connecting surface that extends transverse to the first radially-protruding surface of the first set of spring elements and the second radially-protruding surface of the second set of spring elements.

16. A brake assembly apparatus according to claim 12, wherein the first and second preloaded radial forces associated with the first and second sets of spring elements cooperate to damp feedback vibration of undesirable frequencies between 800 Hz and 3000 Hz between the first and second braking components.

* * * * *